(12) United States Patent
Hamlin et al.

(10) Patent No.: US 9,333,450 B2
(45) Date of Patent: May 10, 2016

(54) HVAC REGISTER FILTER AND METHOD OF USING THE SAME

(71) Applicants: Travis Hamlin, Bakersfield, CA (US); Aaron Lowell Jarrels, Bakersfield, CA (US)

(72) Inventors: Travis Hamlin, Bakersfield, CA (US); Aaron Lowell Jarrels, Bakersfield, CA (US)

( * ) Notice: Subject to any disclaimer, the term of this patent is extended or adjusted under 35 U.S.C. 154(b) by 402 days.

(21) Appl. No.: 13/865,970

(22) Filed: Apr. 18, 2013

(65) Prior Publication Data

US 2013/0228078 A1    Sep. 5, 2013

Related U.S. Application Data

(63) Continuation-in-part of application No. 12/684,849, filed on Jan. 8, 2010, now abandoned.

(60) Provisional application No. 61/211,961, filed on Apr. 6, 2009.

(51) Int. Cl.
| | |
|---|---|
| *B01D 46/00* | (2006.01) |
| *B01D 45/08* | (2006.01) |
| *B01D 46/10* | (2006.01) |
| *B01D 50/00* | (2006.01) |
| *F24F 13/08* | (2006.01) |

(52) U.S. Cl.
CPC ............ *B01D 46/0005* (2013.01); *B01D 45/08* (2013.01); *B01D 46/0016* (2013.01); *B01D 46/0028* (2013.01); *B01D 46/0038* (2013.01); *B01D 46/10* (2013.01); *B01D 50/002* (2013.01); *F24F 13/085* (2013.01); *B01D 2265/026* (2013.01); *B01D 2279/50* (2013.01); *Y10T 29/49826* (2015.01)

(58) Field of Classification Search
CPC .................... B01D 2256/026; B01D 2279/50; B01D 45/08; B01D 46/0005; B01D 46/0016; B01D 46/0028; B01D 46/0038; B01D 46/10; B01D 50/002; F24F 13/085; Y10T 29/49826
See application file for complete search history.

(56) References Cited

U.S. PATENT DOCUMENTS

| | | | |
|---|---|---|---|
| 1,801,949 | A | 4/1931 | Broudy et al. |
| 2,575,499 | A | 11/1951 | Manow |
| 3,046,719 | A | 7/1962 | Tropiano |
| 3,635,001 | A | 1/1972 | Komroff et al. |
| 5,100,445 | A | 3/1992 | Johnson et al. |
| 5,141,707 | A | 8/1992 | Brite |
| 5,240,653 | A | 8/1993 | Ramkissoon |
| 5,273,690 | A | 12/1993 | McDowell |
| 5,368,822 | A | 11/1994 | McNeil |

(Continued)

FOREIGN PATENT DOCUMENTS

WO    WO 2006083859        8/2006

*Primary Examiner* — Christopher P Jones
(74) *Attorney, Agent, or Firm* — R. Scott Kimsey, Esq.; Klein DeNatale Goldner

(57) ABSTRACT

A combination filter and register for a heating, ventilation, and air conditioning system includes a register mounted in a structure and a filter. The register includes a plurality of parallel blades and a plurality of vane members, with a space defined between the two. The register does not have a dedicated access opening. The filter includes a pliable rectangular frame with a pliable filter material spanning it. The pliable filter material and pliable frame allow the filter to be inserted between two of the plurality of parallel blades, or between one of the parallel blades and an edge of the register, for placement of the filter into the space between the blades and the vanes without removing the register from the structure in which it is mounted.

20 Claims, 5 Drawing Sheets

(56) References Cited

U.S. PATENT DOCUMENTS

| | | |
|---|---|---|
| 5,422,078 A | 6/1995 | Colon |
| 5,460,787 A | 10/1995 | Colon |
| 5,472,380 A | 12/1995 | Sarazen |
| 5,643,081 A | 7/1997 | Klein |
| 5,792,230 A | 8/1998 | Moore et al. |
| 5,947,815 A | 9/1999 | Danforth |
| 5,984,776 A | 11/1999 | Berger |
| 6,066,044 A | 5/2000 | Orendorff |
| 6,110,260 A | 8/2000 | Kubokawa |
| 6,190,607 B1 | 2/2001 | Farmer |
| 6,234,893 B1 | 5/2001 | Meredith |
| 6,241,794 B1 | 6/2001 | Jadran et al. |
| 6,309,297 B1 | 10/2001 | Berger |
| 6,422,935 B1 | 7/2002 | Yampolski |
| 6,814,660 B1 | 11/2004 | Cavett |
| 6,848,990 B2 | 2/2005 | Berger |
| 6,872,241 B2 | 3/2005 | Soane et al. |
| 6,878,057 B1 | 4/2005 | Calloura |
| 6,916,240 B1 | 7/2005 | Morton |
| 6,942,710 B2 | 9/2005 | Milano |
| 6,979,361 B2 | 12/2005 | Mihayiov |
| 7,044,993 B1 | 5/2006 | Bolduc |
| 7,789,928 B2 | 9/2010 | Stepp |
| 7,942,957 B2 | 5/2011 | Lee et al. |
| 2003/0205137 A1 | 11/2003 | Bolduc |
| 2008/0184894 A1 | 8/2008 | Grundelman |

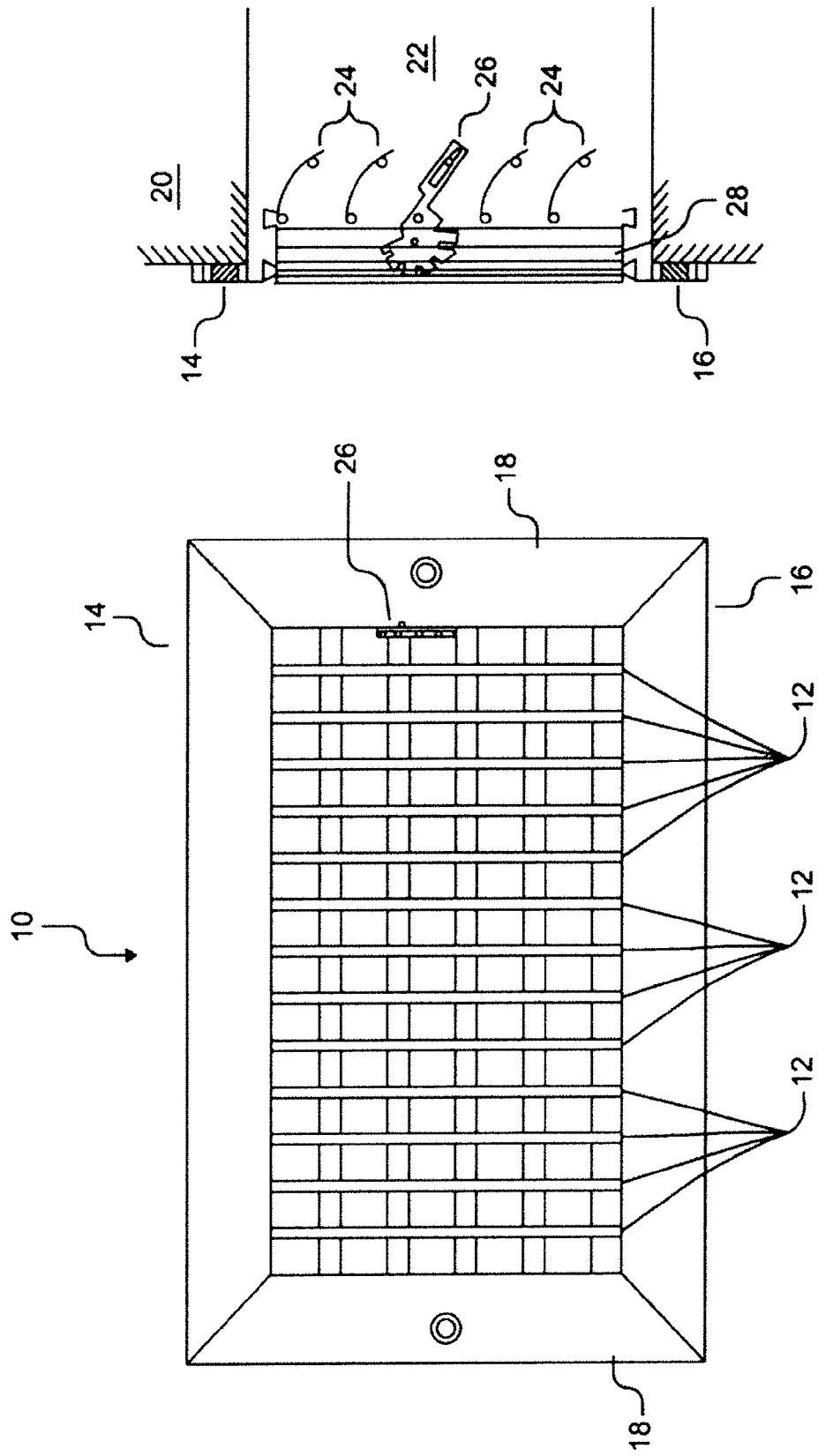

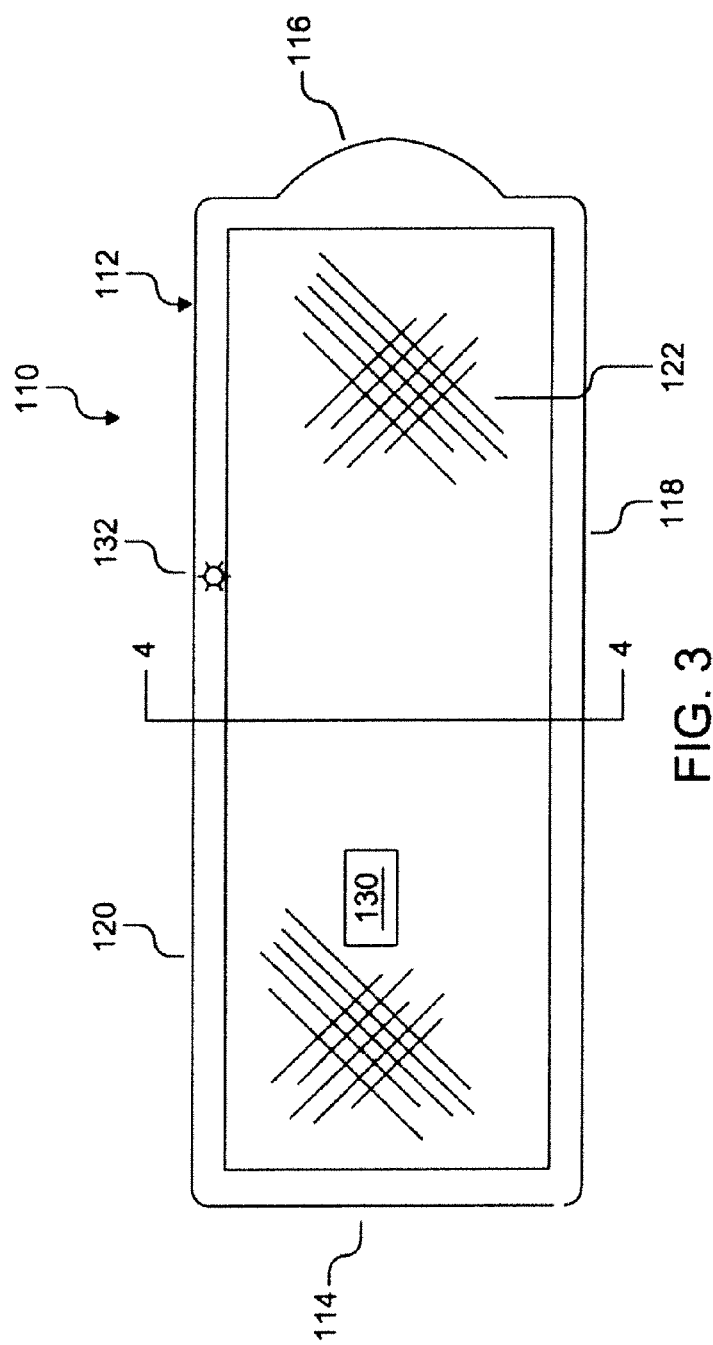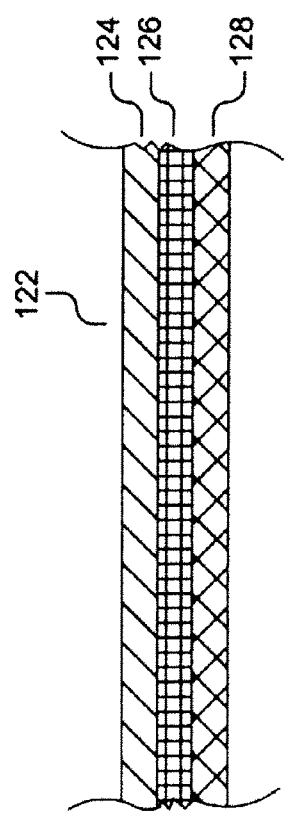

HVAC REGISTER FILTER AND METHOD OF USING THE SAME

RELATED APPLICATIONS

This Application is a Continuation-in-Part of U.S. patent application Ser. No. 12/684,849, filed Jan. 8, 2010 and entitled "HVAC Register Filter and Method of Using the Same," which in turn claims priority to U.S. Provisional Patent Application No. 61/211,961, filed Apr. 6, 2009. Both of these prior applications are incorporated by reference herein in their entireties.

BACKGROUND OF THE INVENTION

The United States Environmental Protection Agency has said that indoor air may be two to five times more polluted than outdoor air. This conclusion raises obvious health concerns, and suggests that appropriate steps should be taken to address this issue. The primary defense mechanism for building occupants is effective filtration utilized in conjunction with the structures HVAC (Heating, Ventilating and Air Conditioning) equipment. The filtration is generally utilized at the inlet to the HVAC system. However, dust, mold or other particulate matter may be present or accumulate in the ducting system, past the inlet filter. Thus these substances may be discharged through the interior outlets of the HVAC system, providing a potential health hazard to the building occupants. One manner of addressing this problem is by filtering the air discharged at the HVAC outlet.

SUMMARY OF THE INVENTION

There have been efforts to filter the discharged air at the HVAC outlets. The HVAC outlet, often referred to as a register, provides some control of the discharged air. One commonly used register is mounted at the termination of a section of ducting with the register closely or flush mounted with the floor, wall, or ceiling. The register will typically provide some means for controlling the direction and quantity of air flowing through the register and into the room. The typical register comprises a plurality of parallel blades which are mounted on the "exterior" side of the register—that is the side of the register facing into the room. The term "exterior" when utilized with respect to a register, applies this convention—that the exterior side of the register is that facing into the room.

The register also comprises a plurality of vane members disposed behind the parallel blades, where a space is defined between the parallel blades and the plurality of vane members. The blade members are typically fixed, while the vane members are typically adjustable with a slide lever or control knob which extends between the blades for manual access.

Some efforts have been made to filter the air being discharged through the above-described register. However, the known devices have either required that the register be removed from the wall, floor, or ceiling for installation of the filter device, or else have provided means for attaching the filter to the outside edge of the register. The first type of device thus has the inconvenience of having to remove the register, usually requiring tools, for insertion of the filter. Because the filters must periodically be replaced or cleaned, this characteristic presents a significant impediment in the utilization of the devices. The second type of device, which attaches to the outside of the register, solves the problem presented by the first type. However, the second type presents other disadvantages. These devices typically utilize an elastic band or similar device to fit around the outside frame of the register. However, obtaining a secure attachment can be problematic. Moreover, as the filter becomes dirty over time, the pressure drop across the filter might increase to the point to where the filter is either blown off of the register, or dislodged to the point that air is blowing around the filter, defeating its purpose.

The present apparatus resolves the above disadvantages. Embodiments of the disclosed apparatus are used in combination with a register for an HVAC system, where the register is mounted to a wall, floor, or ceiling. The register comprises a plurality of parallel blades which are located on the exterior side of the register and a plurality of vane members set behind the parallel blades, wherein a space is defined between the parallel blades and the plurality of vane members. The filter of the combination comprises a pliable rectangular frame and a pliable filter material spanning across the pliable rectangular frame. The pliable rectangular frame and pliable filter material allow the filter to be inserted between the blades for placement in the space without removing the register from the wall, floor or ceiling. In addition to a non-scented embodiment, embodiments of the present invention may comprise a filter material which has been treated with a fragrance or scent. Thus, when air is forced through the filter into the room, it may be accompanied by a pleasant fragrance.

Various filter materials might be utilized. For example, the filter material may comprise a wire mesh reinforcement member for adding additional strength to the filter. The filter material may also comprise particles of silver which has antiviral properties which inhibit the passage of various bacteria and viruses.

One embodiment of the invention provides a combination filter and register for a heating, ventilation, and air conditioning system. The combination includes a register mounted in a structure and a filter. The register includes a plurality of parallel blades and a plurality of vane members, with a space defined between the two. The register does not have a dedicated access opening. The filter includes a pliable rectangular frame with a pliable filter material spanning it. The pliable filter material and pliable frame allow the filter to be inserted between two of the plurality of parallel blades, or between one of the parallel blades and an edge of the register, for placement of the filter into the space between the blades and the vanes without removing the register from the structure in which it is mounted.

In another embodiment of the invention, the filter includes a tab at the trailing end of the filter. The tab catches on the register when the filter is inserted into the register to limit the extent to which the filter can be inserted.

In another embodiment of the invention, the filter material includes a substance that is dispersed into an air stream when the air stream passes through the filter material.

In another embodiment of the invention, the filter material includes a fragrance.

In another embodiment of the invention, the filter material includes silver.

In another embodiment of the invention, the filter material includes a wire mesh reinforcement member.

In another embodiment of the invention, the filter material includes a means for immobilizing bacteria.

In another embodiment of the invention, the filter material is fiber glass cloth filter, filter fabric, filter cloth, needle felt, polyester air filter cloth, polypropylene air filter cloth, polyester filter felt, non-woven carbon fabric filter, or combinations of these.

Another embodiment of the invention provides a method for filtering an air stream discharged from a forced heating, ventilation, and air conditioning system. The method includes the steps of inserting a leading edge of a filter as described herein into the space between a plurality of parallel blades and a plurality of vane members, in a register as described herein, and pushing on the trailing edge of the filter until substantially all of the filter is disposed in the space between the plurality of parallel blades and the plurality of vane members.

In another embodiment of the invention, the filter is pushed until a tab of the filter catches on one of the plurality of parallel blades or an edge of the register and prevents the filter from being further inserted into the space.

Another embodiment of the invention provides a filter having a pliable rectangular frame forming a leading edge, a trailing edge, and two opposing longitudinal sides of the filter. A pliable filter material spans across the rectangular frame. A tab is formed in the trailing edge of the frame. The pliable filter material and pliable rectangular frame allow the filter to be inserted between two of the plurality of parallel blades of a register, or between one of the blades and an edge of the register, for placing the filter into a space between the plurality of parallel blades and the plurality of vane members without removing the register from a structure in which it is mounted. The tab catches on a surface of the register to limited the extent to which the filter can be inserted into the space.

BRIEF DESCRIPTION OF THE DRAWINGS

FIG. 1 shows a front view of an HVAC register which may be utilized in combination with embodiments of the disclosed filter.

FIG. 2 shows a side view of the HVAC register of FIG. 1 as installed in a wall and connected to ducting.

FIG. 3 schematically shows an embodiment of the disclosed filter.

FIG. 4 shows a cross-section of the filter of FIG. 3 along line 4-4.

DETAILED DESCRIPTION OF THE INVENTION

Figure 5:
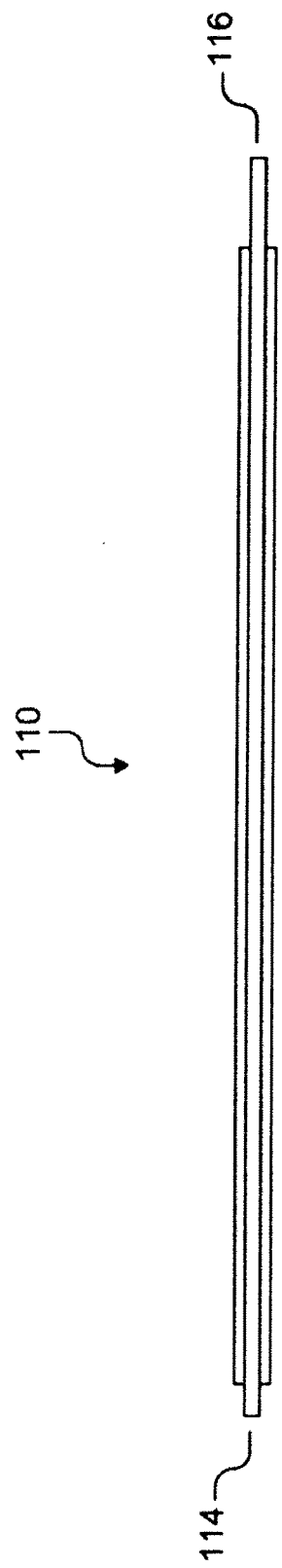
FIG. 5 shows a top view of an embodiment of the disclosed filter.

Referring now to the figures, FIGS. 1 and 2 show the type of HVAC register which may be used in combination with the disclosed filter. This type of register 10 comprises a plurality of parallel blades 12 which are disposed between an upper frame member 14 and a lower frame member 16, which form, together with side members 18, an exterior frame for the register. This type of HVAC register typically mounts within a wall, floor, ceiling, or any suitable structure with the exterior frame facing outwardly, as shown in FIG. 2, facing into a room. FIG. 2 depicts a register 10 mounted on a wall 20, although it is to be appreciated that the register may also be installed within a floor or ceiling without changing the application of the filter disclosed herein. Register 10 is placed at the termination of ductwork 22. Register 10 further comprises a plurality of vane members 24 which are disposed behind the parallel blades 12. The vane members 24 are often adjustable with an operator 26 which allows the vane members to either be opened wider to allow greater air flow into the room or to be closed to restrict the flow of air into a room. The vane members are separated from the parallel blades 12 to allow the movement of the vane members. Thus, a space 28 is defined between the parallel blades 12 and the plurality of vane members 24. It should be noted that space 28 may be referred to herein as being "behind" the plurality of parallel blades 12. The use of the word "behind" in this manner refers to the space as oriented in FIG. 2, with the parallel blades positioned at the end of the register that opens to the room, and the vane members positioned deeper within the register as shown.

FIGS. 3 through 5 schematically show an embodiment of a filter 110 which might be utilized in combination with register 10. Filter 110 comprises a pliable rectangular frame 112. Rectangular frame 112 comprises a leading edge 114, a trailing edge 116, a bottom edge 118 and a top edge 120. It is to be appreciated that the terms "top" and "bottom" are utilized with reference to FIG. 3 and are of no particular significance with the orientation of the filter 110 in actual usage.

A pliable filter material 122 spans across the pliable rectangular frame 112. The filter material 122 may comprise fiber glass filter cloth, filter fabric, filter cloth, needle felt, polyester and polypropylene air filter cloth, polyester filter felt, non-woven carbon fabric filter, and any combinations thereof. Any other suitable material may also be used. The filter material 122 may also comprise silver particles. Silver is effective in breaking disulfide bonds which form the structure of various viruses, such that the filter material inactivates various viruses which may be transported through the HVAC ducting system. The filter material may comprise electrostatic properties which capture viruses, bacteria and other particulate matter, such that the filter material immobilizes such matter and prevents its dispersion into the room. As shown in FIG. 4, the filter material 122 may be configured in a laminated configuration, which may combine various materials. For example, the filter material may comprise an exterior layer 124 of woven filter material, an interior layer 126 of an absorbent material, and an exterior layer of a wire mesh reinforcement member 128 for structural integrity. The interior layer of absorbent material 126 may be infused with a fragrance which is dispersed from the filter material by air blown through the filter by the HVAC system blower. For example, the absorbent material 126 may be infused with pine, apple, cinnamon, eucalyptus, rose, or other appealing fragrances. The fragrances may be of the type in which the mobility of the fragrance is enhanced by the application of heat, such as when heated air is blown through the filter 110. In addition to or instead of fragrances, the absorbent material may be infused with any desired substance capable of being dispersed into the air when the filter is in use in a HVAC register.

Figure 6:
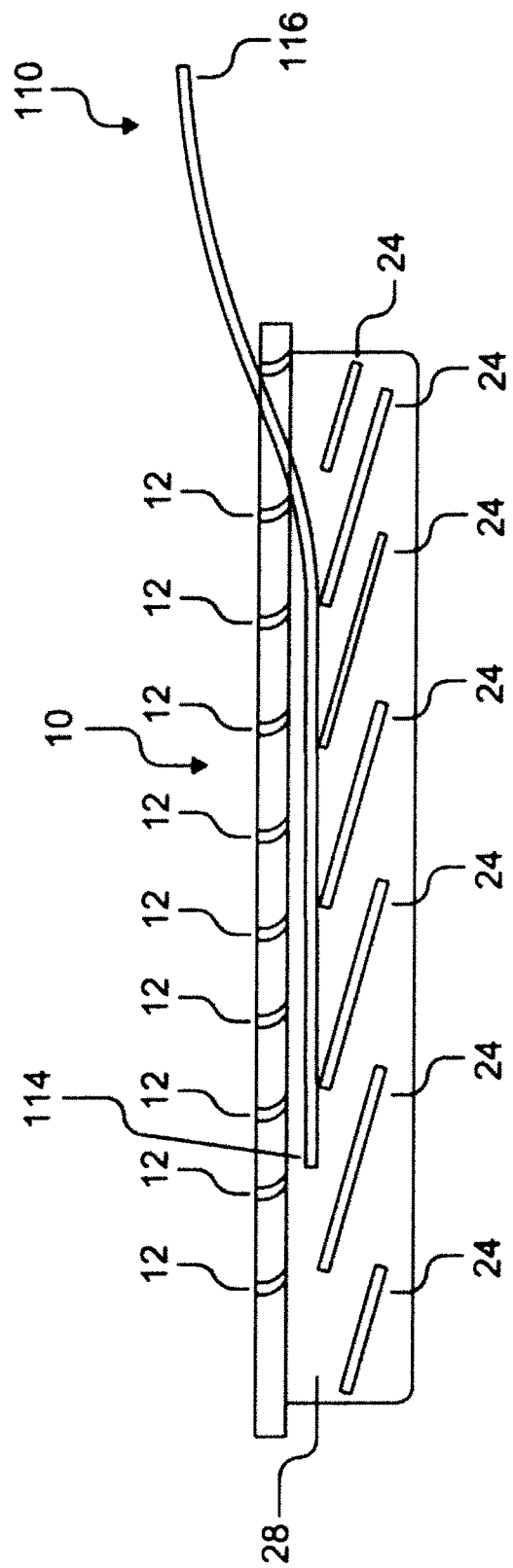
FIG. 6 schematically shows how an embodiment of the disclosed filter may be installed into an HVAC register between the blades of the register.

FIG. 6 shows how an embodiment of filter 110 is used in combination with register 10. Unlike other register filters, the filter 110 disclosed herein is constructed such that it may be installed within the register without removing the register from the wall 20, or floor or ceiling as the case may be. As shown in FIG. 6, filter 110 is slid into the space 28 defined by the parallel blades 12 and the plurality of vane members 24, with the leading edge 114 first slid between adjacent parallel blades at one end of the register 10. Filter 110 may be fabricated in such a manner as to facilitate this installation process. For example, leading edge 114 and trailing edge 116 may be fabricated from stiffer material than bottom edge 118 and a top edge 120, such that the bottom edge and top edge flex when being "bent" around one of the blade members, but the stiff leading edge 114 penetrates into the space 28 without excessive deflection. Likewise, the use of stiffer material in the fabrication of trailing edge 116 allows that member to be pushed without having excessive deflection. For example, the leading edge 114 and the trailing edge 116 may be fabricated to have a stiffness which is at least twice the stiffness of the bottom edge 118 and the top edge 120. This greater stiffness may be gained from the use of different materials, or from fabricating the leading edge 114 and trailing edge 116 to have a thickness approximately twice that of the bottom edge 118 and top edge 120. Suitable materials for rectangular frame 112 may comprise cardboard products or thin walled plastic.

Figure 7:
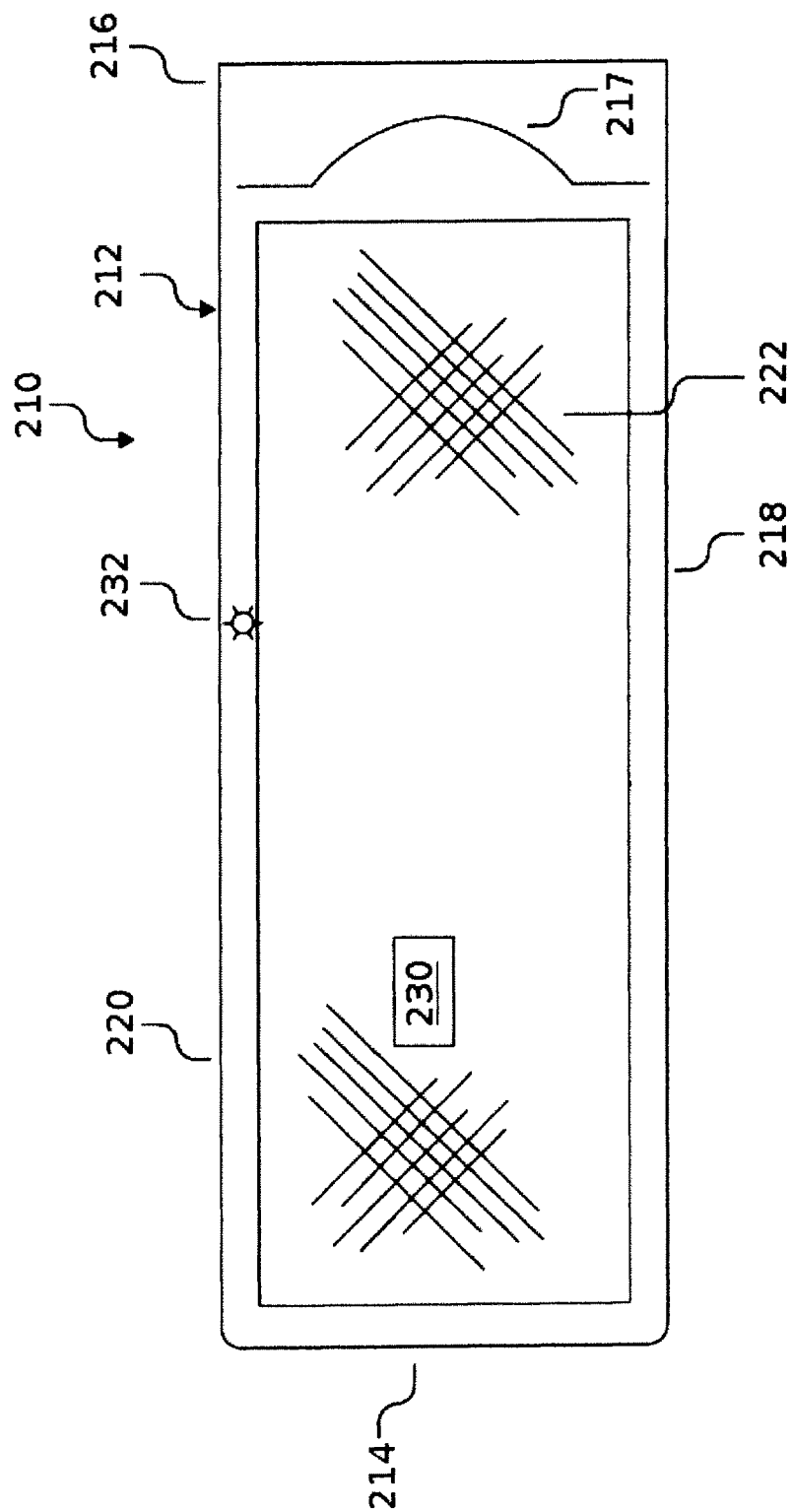
FIG. 7 schematically shows one alternative embodiment of the disclosed filter.

FIG. 7 shows one alternative embodiment of a filter 210 suitable for use with a register 10 as described herein. As with the embodiments of the filter described above, filter 210 is constructed such that it may be installed within a register without removing the register from the wall, floor, or ceiling, as the case may be. Filter 210 is preferably slid into space 28 defined by parallel blades 12 and the plurality of vane members 24 as described above, with leading edge 214 first slid between adjacent parallel blades at one end of register 10. Filter 210 may be fabricated in such a manner as to facilitate this installation process. For example, leading edge 214 and trailing edge 216 may be fabricated from stiffer material than bottom edge 218 and top edge 200, such that the bottom edge and top edge flex when being "bent" around one of the blade members, but the stiff leading edge 214 penetrates into the space 28 without excessive deflection. Likewise, use of stiffer material in the fabrication of trailing edge 216 allows that members to be pushed without having excessive deflection.

In the embodiment of filter 210 shown in FIG. 7, trailing edge 216 has a rectangular shape providing a larger surface area at the trailing edge of filter 210. This portion of filter 210 may also be referred to as a "trailing end" herein. Trailing edge 216 also preferably includes a cutout tab 217 that may be pushed outward by a user of filter 210, such as by pushing with the user's thumb or a finger. Cutout tab 217 may be pushed out in either direction, and when pushed out, tab 217 acts as a "stop" to restrict how far filter 210 can be pushed into a register. This prevents filter 210 from becoming lost in the register space between the vanes and the parallel blades, and also facilitates easy grasping and removal of filter 210 when filter 210 needs to be replaced.

Embodiments of the filter 110 may also comprise visual indication means 130 which are preferably placed disposed on the outwardly facing surface of the filter, where the visual indication means indicates when the apparatus should be replaced. For example, a dye which degrades over time may be utilized to provide an indication that the filter has been in use for over a particular period of time, such as thirty days. This indicator, which is visually apparent when looking toward the register, thus provides a notice to the user that it is time to replace the filter. Alternatively, the visual indication means may be connected to a simple circuit which determines the pressure differential across the filter, and which causes the visual indication means to be activated when the pressure differential reaches a predetermined amount. For example, if the pressure at the inwardly facing surface of the filter 110 exceeds the pressure at the outwardly facing surface by 0.25 inches of water, the circuit might cause an LED 132 embedded in the rectangular frame 112 to be illuminated.

The disclosed apparatus may be employed to provide a method for filtering the air stream discharged from a forced air heating, ventilation and air conditioning system, where the system delivers air into a room through a register mounted to a wall, floor, or ceiling. As discussed above, the register 10 comprises a plurality of parallel blades 12 and a plurality of vane members 24 which disposed behind the plurality of parallel blades, such that a space 28 is defined between the plurality of parallel blades and the plurality of vane members. It should be noted that register 10 and other registers suitable for use with the present invention do not include a dedicated slot or opening provided specifically for insertion of a filter thereinto. Filters for use with registers having dedicated openings to receive them are undesirable because an existing structure must be retrofitted with the appropriate registers before the filters can be used. The present filters are designed to be used with common, existing registers not having a dedicated slot or opening for insertion of a filter therein.

As known with HVAC systems, a blower is utilized for forcing the air through the register into the room. In the method, the blower is preferably turned off, to facilitate installation of the filter. The user then inserts the leading edge 114 of a filter 110 between two adjacent parallel blades 12 of the register 10, at one end of the register. The filter 110 comprises a pliable rectangular frame 112 and a pliable filter material 122 which spans across the pliable rectangular frame. The pliable rectangular frame 112 comprises the leading edge 114 and a trailing edge 116. The user pushes on the trailing edge 116 until substantially all of the filter is disposed in the space between the plurality of parallel blades 12 and the plurality of vane members 24, such that the filter 10 spans substantially the length of the register 10, from one end to the other. When inserted in this manner, the filter 110 covers all of the vane members 24, such that substantially all of the air from the duct work 22 is blown through the filter 110. Once the filter 110 is thus inserted, the blower may be turned back on.

Having thus described the preferred embodiment of the invention, what is claimed as new and desired to be protected by Letters Patent includes the following:

1. A combination filter and register for a heating, ventilation, and air conditioning system, the combination comprising:
    a register mounted in a structure and comprising a plurality of parallel blades and a plurality of vane members disposed behind the parallel blades, wherein a space is defined between the parallel blades and the plurality of vane members, the register not comprising a dedicated access opening for receiving a filter; and
    a filter comprising a pliable rectangular frame and a pliable filter material spanning across the pliable rectangular frame, wherein the pliable filter material and pliable rectangular frame allow the filter to be inserted between two of said plurality of parallel blades of said register, for placement into the space between the plurality of parallel blades and the plurality of vane members without removal of the register from the structure in which it is mounted.

2. The combination according to claim 1, wherein the filter comprises a tab at a trailing end thereof, the tab catching on a surface of the register when the filter is inserted into the register to limit the extent to which the filter can be inserted.

3. The combination according to claim 1, wherein the filter material comprises a substance that is dispersed into an air stream when the air stream passes through the filter material.

4. The combination according to claim 3, wherein the filter material comprises a fragrance.

5. The combination according to claim 1, wherein the filter material comprises silver.

6. The combination according to claim 1, wherein the filter material comprises a wire mesh reinforcement member.

7. The combination according to claim 1, wherein the filter material comprises a means for immobilizing bacteria.

8. The combination according to claim 1, wherein the filter material is selected from the group consisting of fiber glass filter cloth, filter fabric, filter cloth, needle felt, polyester air filter cloth, polypropylene air filter cloth, polyester filter felt, non-woven carbon fabric filter, and combinations thereof.

9. A method for filtering the air stream discharged from a forced air heating, ventilation and air conditioning system which delivers air into a room through a register mounted to a wall, floor, or ceiling, the register comprising a plurality of parallel blades and a plurality of vane members disposed behind the plurality of parallel blades, wherein a space is defined between the plurality of parallel blades and the plurality of vane members, the register not comprising a dedicated screen access opening, the forced air stream having a blower for forcing the air through the register into the room, the method comprising the following steps: inserting a leading edge of a filter between two of said plurality of parallel blades into the space between the plurality of parallel blades and the plurality of vane members, the filter comprising a pliable rectangular frame and a pliable filter material spanning across the pliable rectangular frame, wherein the pliable rectangular frame comprises the leading edge and a trailing edge; and pushing on the trailing edge of the filter until substantially all of the filter is disposed in the space between the plurality of parallel blades and the plurality of vane members.

10. The method according to claim 9, wherein the filter is pushed until a tab of said filter catches on one of said plurality of parallel blades, or on an edge of said register, such that the filter cannot be further inserted into the space.

11. The method of claim 9 wherein the filter material comprises a fragrance.

12. The method of claim 9 wherein the filter material comprises a wire mesh reinforcement member.

13. The method of claim 9 wherein the filter material comprises silver.

14. The method of claim 9 wherein the filter material comprises means for immobilizing bacteria.

15. The method of claim 9 wherein the filter material is selected from the group consisting of fiber glass filter cloth, filter fabric, filter cloth, needle felt, polyester air filter cloth, polypropylene air filter cloth, polyester filter felt, non-woven carbon fabric filter, and combinations thereof.

16. A filter for filtering the air stream discharged from a forced air heating, ventilation, and air conditioning system, the filter comprising:
- a pliable rectangular frame forming a leading edge, a trailing edge, and two opposing longitudinal sides of said filter;
- a pliable filter material spanning across the pliable rectangular frame; and
- a tab formed in the trailing edge of said frame, wherein the pliable filter material and pliable rectangular frame allow the filter to be inserted between two of a plurality of parallel blades of a heating, ventilation, and air conditioning register for placement of the filter into a space between the plurality of parallel blades and plurality of vane members of the register without removal of the register from the structure in which it is mounted, and further wherein the tab catches on a surface of the register to limit the extent to which the filter can be inserted into the space.

17. The filter according to claim 16 wherein the pliable filter material comprises a substance that is dispersed into an air stream when the air stream passes through the filter material.

18. The filter according to claim 17 wherein the pliable filter material comprises a fragrance.

19. The filter according to claim 16 wherein the pliable filter material comprises silver.

20. The filter according to claim 16 wherein the pliable filter material comprises a means for immobilizing bacteria.

* * * * *